United States Patent Office 3,000,070
Patented Sept. 19, 1961

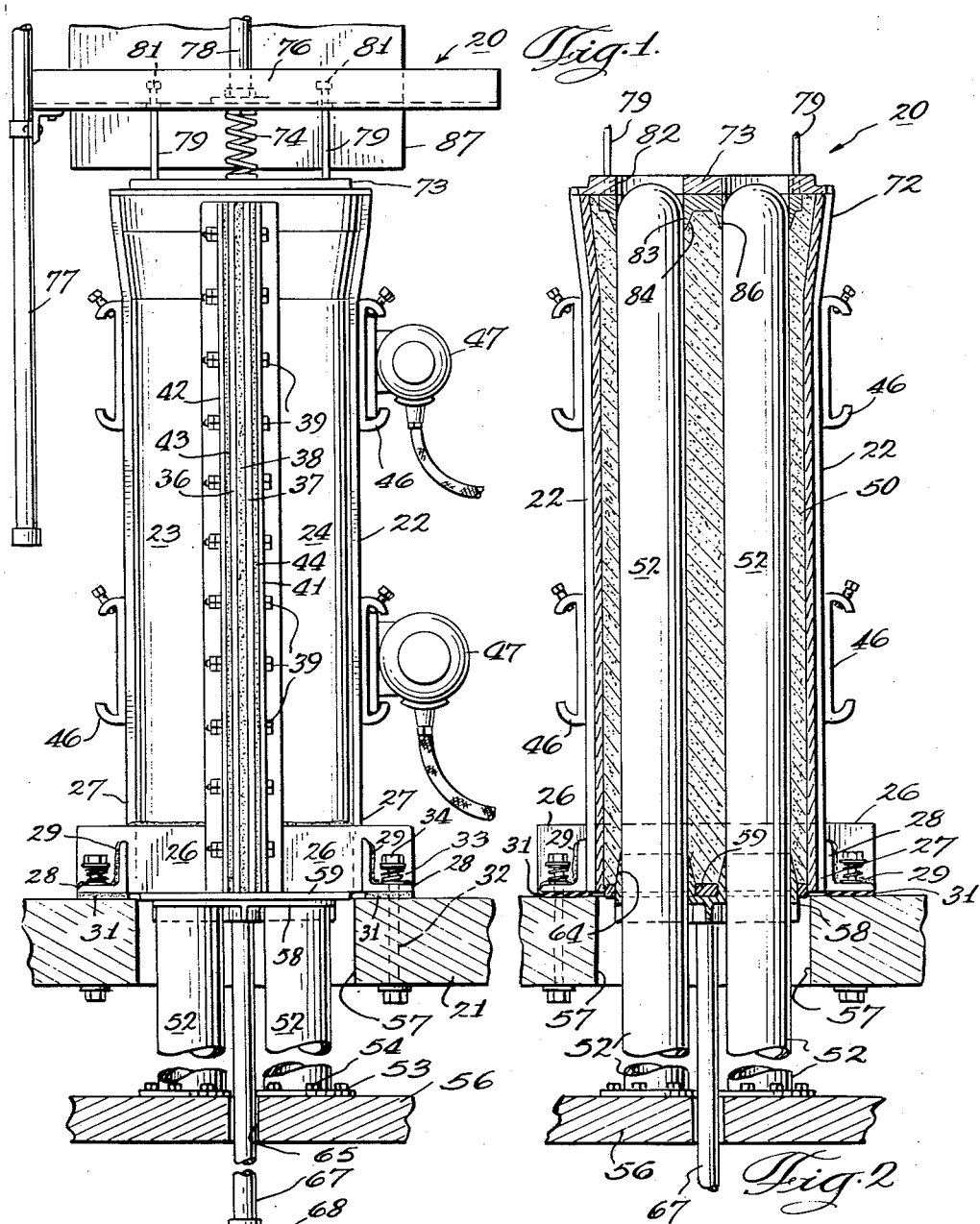

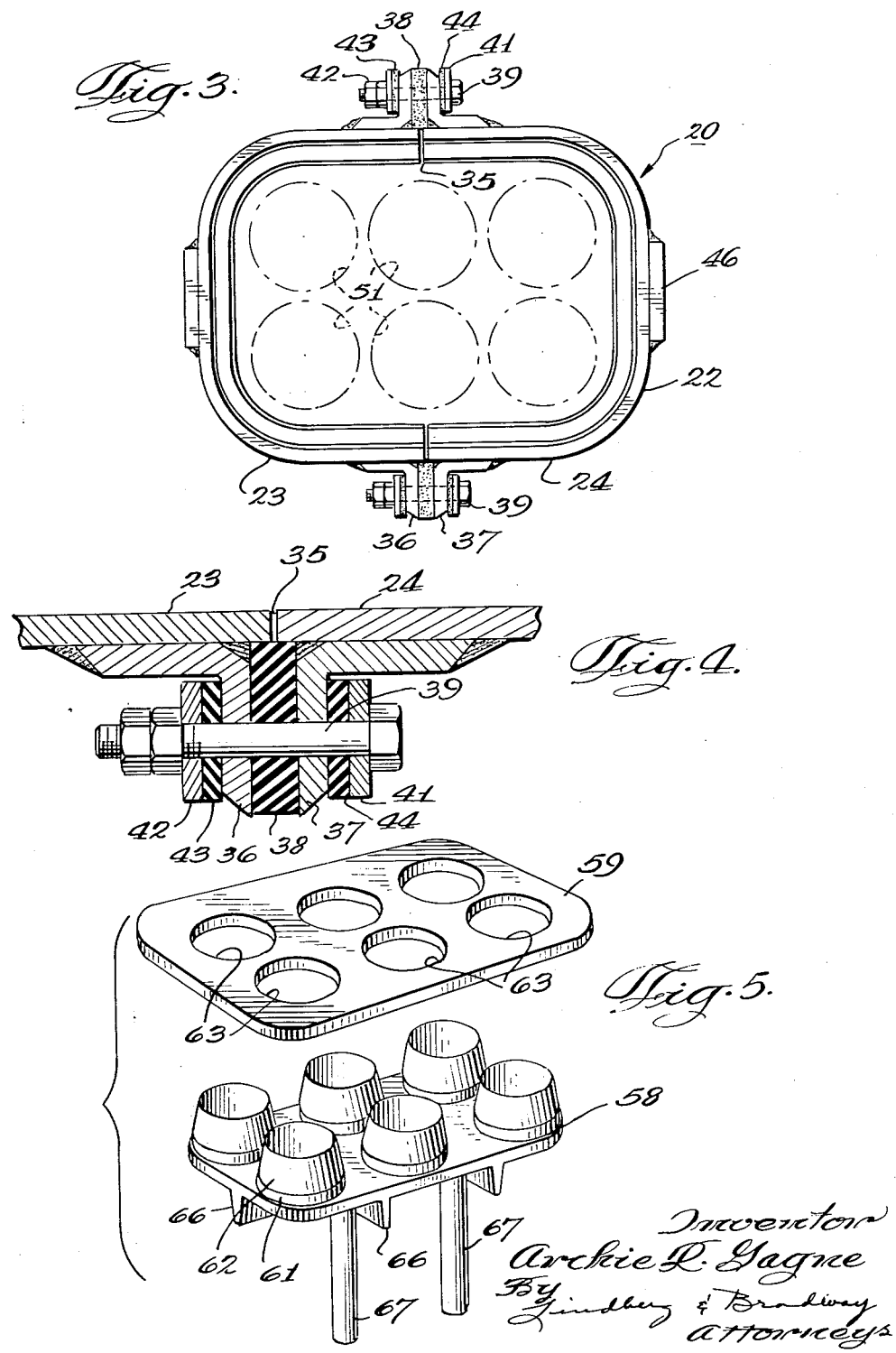

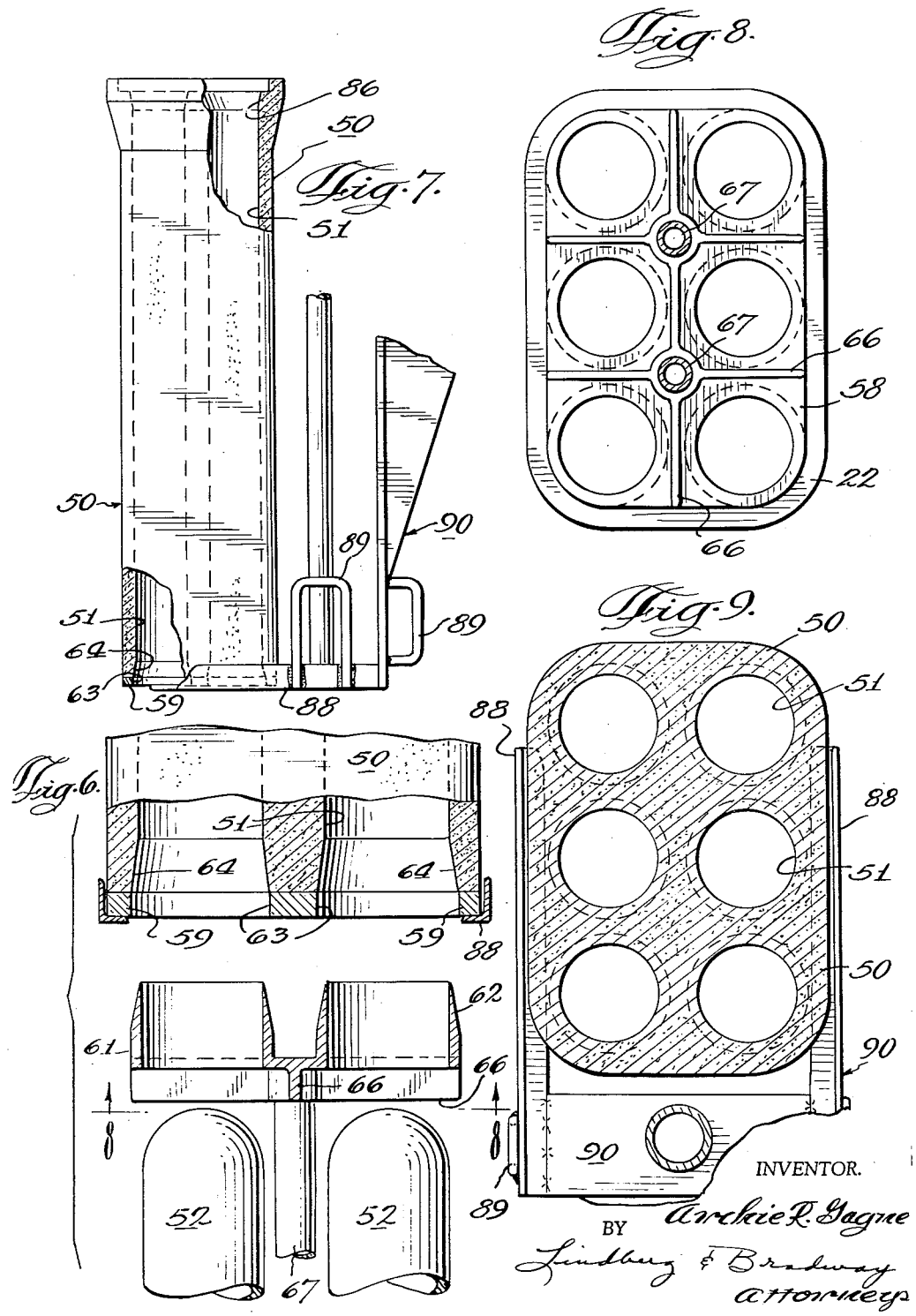

3,000,070
MACHINE FOR MAKING MULTI-DUCT CONDUIT
Archie R. Gagne, Franklin Park, Ill., assignor to Gagne Enterprises, Inc., Naperville, Ill., a corporation of Illinois
Filed May 7, 1958, Ser. No. 733,542
3 Claims. (Cl. 25—41)

This invention relates generally to machines for making conduit from a plastic material, and particularly to a machine where the finished product therefrom is extruded from a mold in which it is formed.

The product resulting from use of the machine finds particular application for protecting underground cables, such as telephone, telegraph or power cables.

According to the present invention, the multi-duct conduit is formed in a mold having a plurality of mandrels extending longitudinally therein. The number of these mandrels is varied according to the number of ducts in the finished piece of conduit. The mandrels pass through a lower pressure pallet or platen having circular openings therein according to the number of the mandrels forming the ducts. This lower pressure pallet has integral therewith a spider with reenforcing arms extending between the mandrels, the spider cooperating with one or more push rods each disposed at the point of intersection of any four of the mandrels. The spider together with the push rods is operable by a crosshead to extrude a finished piece from the mold.

The lower pressure platen is provided with beveled or chamfered rings which closely fit the mandrel and enabling the finished product to have a chamfer therein at what may be considered the spigot end of the conduit.

The mandrels extend into an upper pressure platen likewise having a chamfered ring thereon surrounding the mandrels and likewise providing a chamfer in the end of the duct adjacent the bell end of the conduit. The upper pressure platen is preferably subjected to a compacting load by means of a spring and crosshead, the spring enabling the mold to be vibrated to increase the compaction of the concrete.

According to the present invention, the mold for compacting the plastic mass therein consists of one or more longitudinally extending mold portions which are spaced a slight distance from each other along contiguous mold portions, and the longitudinally extending mold portions are resiliently connected together. Means are provided for vibrating the mold consisting of the resiliently connected mold portions so that the mold portions have excursion with respect to each other to compact the plastic material in the mold.

The structure according to the present invention makes it possible to mold extremely dense concrete characterized by a very low water-cement ratio, and the concrete mass within the mold in contact with the mold portions on the longitudinally extending mandrels is characterized by an extremely hard, glassy finish. Such finish makes it possible to "snake" extremely long lengths of heavy cable without undue friction, thereby making the distance between splices at cable vaults longer than has been possible heretofore.

The lower pressure platen also supports a transfer platen, the transfer platen being extruded with the molded article, and forming a base for the so extruded article, the transfer platen being subsequently engaged by the tines of a suitable lifting and transporting device.

With the aforesaid considerations in mind, it is a principal object of this invention to provide an improved apparatus for forming multi-duct conduit.

Another object is to provide apparatus for forming conduit of the aforesaid description characterized by high density and high strength, the resultant product being extremely impervious to seepage and having high beam strength when placed in a trench or the like.

Other objects and important features of the invention will be apparent from a study of the specification following taken with the drawings which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

In the drawings:

FIG. 1 is an elevational view of the machine, according to the present invention, for making multi-duct conduit;

FIG. 2 is a longitudinal sectional view thereof;

FIG. 3 is a top view of the mold seen in FIGS. 1 and 2;

FIG. 4 is a detailed transverse sectional view taken through the mold seen in FIG. 3, showing a resilient means for connecting the longitudinally extending mold portions in assembled relationship;

FIG. 5 is an exploded perspective view showing details of a lower pressure platen and a transfer platen adapted to rest thereon, said lower pressure platen being adapted to compact the plastic mass formed in the mold seen in FIGS. 1, 2 and 3;

FIG. 6 is an exploded vertical view, certain parts being shown in longitudinal section, showing the finished article completely extruded from its mold and raised upon a transfer platen, said transfer platen being shown as engaged by the tines of a suitable fork lifting device;

FIG. 7 is an elevational view showing the manner in which the finished length of conduit is raised upon its transfer platen and being lifted by a fork type of lifting device;

FIG. 8 is a bottom plan view of the lower pressure platen showing details of reenforcing ribs therefor, and showing the pressure applying means therefor disposed at the intersection of four of the longitudinally extending mandrels; and FIG. 9 is a plan view of a fork lifting device showing it in position engaging the sides and bottom of a transfer platen for lifting of the completed molded length of conduit.

Referring now particularly to FIGS. 1, 2 and 3 of the drawings, the improved machine for forming multi-duct conduit is referred to generally by the reference numeral 20 and includes a deck 21 for supporting a hollow mold 22 of rectangular shape. As seen also in FIG. 3 the mold 22 is formed of longitudinally extending half portions 23 and 24. Each of the sides of each mold half has welded thereto a plate 26, and the lower end 27 of each mold half has a base angle 28 welded thereto, the ends of the base angle being welded as at 29 to the plate 26.

The base angle 28 rests upon a resilient pad 31, and the mold 22 is secured in place on the deck 21 by bolts 32 passing through the deck, there being a spring 33 interposed between the base of the angle 28 and a nut 34 threaded to the bolt 32.

As seen also in FIGS. 3 and 4, the mold portions 23 and 24 are separated a slight amount as seen at 35. The two mold halves are resiliently connected together by angle members 36 and 37 extending outward from the respective mold portions 23 and 24, and being in confronting relationship, there being a longitudinally extending rubber shim 38 located between the angles 36 and 37. A plurality of bolts 39 passes through the angles 36 and 37, and the bolt 39 is provided with washers 41 and 42 maintained in resiliently spaced relationship from the angles 36 and 37 by means of rubber washers 43 and 44.

The mold 22 is provided with brackets 46 for holding a vibrator 47 thereto, and as seen in FIGS. 1 and 2, a number of such brackets 46 are provided on the mold sides so that one or more vibrators 47 can be provided for vibrating the contents within the mold 22.

The construction just described for the mold 22 and the resilient connection between the mold halves 23 and 24 comprising resilient rubber shim 38 enables the mold halves to have excursion with respect to each other, the amount of such excursion being limited by the compressibility of the shim 38 and the washers 43 and 44.

The mold described with reference to FIGS. 1, 2 and 3 is adapted to mold therein multi-duct pieces of conduit 50 seen particularly in FIG. 7, the conduit 50 having a number of ducts 51 therein. These are formed by mandrels 52 extending lengthwise within the mold 22. The mandrels 52 are made from hollow steel tubing and are heavily chromium plated to a thickness of the order of .005 in. or more to resist abrasion by the material being molded with in the mold 22.

The mandrels 52 are each provided with a flange 53 at the lower end thereof, each mandrel being secured by cap screws 54 passing through the flange 53 and threaded into a fixed cross member 56. The mandrels 52 extend through an opening 57 in the deck 21, and the mold 22 is secured in position over the opening 57 in the manner described above.

The lower end of the mold 22 is closed by means of a lower pressure platen 58, see also FIGS. 5, 6 and 8, the dimensions of which are somewhat smaller than the dimensions of the opening in the mold 22 as seen also in FIG. 6. A transfer platen 59 rests upon the lower pressure platen 58, as seen in FIGS. 1 and 2. The lower pressure platen 58 has welded thereto sleeves 61 which extend upward from lower pressure platen 58. The sleeves 61 have frustro-conical extensions 62 therefrom. The inner diameter of the sleeves 61 and the frusto-conical extensions 62 conform to the diameter of the mandrel 52 and enable the mandrel 52 to pass therethrough. The transfer platen 59 has holes 63 therein having a diameter conforming to the diameter of the sleeves 61 welded to the upper surface of the lower pressure platen 59.

The frusto-conical extension 62 on the sleeve 61 thus provides a corresponding frustro-conical surface or chamfer 64 in the lower spigot end of the conduit 50 molded within the mold 22.

The lower surface of the lower pressure platen has extending therefrom stiffening ribs 66 which intersect between four contiguous sleeves 61, see also FIG. 8.

The juncture points of the intersecting ribs 66, have secured thereat longitudinally extending pressure transmitting members 67, the lower end of each pressure transmitting member 67 being connected to a crosshead 68 connected at its lower side to a piston rod 70 of a double acting cylinder 69. Fluid is supplied at the piston rod end of the cylinder 69 by means of a supply line 71, and there is a similar supply line, not shown, connected to the cylinder head end of the cylinder 69, for the purpose of raising and lowering the lower pressure platen 58 in a manner well understood by the art.

As seen in FIGS. 1 and 2, the pressure transmitting members 67 pass through openings 65 in the fixed crosshead 56 supporting the mandrels 52.

The upper end of the mold 22 is provided with a bell 72, and the upper end of the mold 72 is closed by an upper pressure platen 73, pressure being applied to the upper platen 73 by means of a spring 74 interposed between the upper pressure platen and an upper crosshead 76. The crosshead 76 is also guided by a vertical rod 77 and pressure is applied to the crosshead 76 by means of a pressure transmitting member 78 connected to an hydraulic cylinder, not shown. Guide pins 79 are connected to the upper pressure platen 73 and are provided with heads 81 so that when the crosshead 76 moves in an upward direction, the upper pressure platen 73 is carried therewith.

The upper pressure platen has circular openings 82 therein, conforming to the diameter of the mandrels 52, and the lower side of the upper pressure platen 73 has guides 83 for the mandrels 52, each guide 83 having a frustro-conical surface 84, so as to provide a chamfer 86 at the bell end of the conduit 50.

In operation, the mold is secured over the opening 57 in the stage 21, the mandrels 52 extending lengthwise of the mold 22. The lower pressure platen 58, together with its transfer platen 59, is moved by the pressure transmitting members 67 to a position where the top surface of the transfer platen 59 is even with the bottom of the mold 22. The mold is then filled with Portland cement-concrete or other plastic materials from a hopper 87 disposed above the top of the mold 22, the upper pressure platen 73 being removed from the top of the mold during the filling process. Thereafter, the upper pressure platen is placed in position as seen in FIG. 2 and pressure is applied to both the lower pressure platen and the upper pressure platen while the mold and its contents are vibrated by the vibrators 47. The split mold together with its longitudinally extending resilient connection enables the vibration to be transmitted through the mold halves into the mass within the mold, the mold halves having excursion with respect to each other by means of the resilient connection between the mold halves.

At the conclusion of the vibrating period, the upper pressure platen is removed, and the finished conduit 50 is extruded from the mold by means of the lower pressure platen 58 and its transfer platen 59, two platens being raised by the cylinder 69 and the pressure transmitting members 67. The extruded piece then rests upon its transfer platen 59, see also FIGS. 6 to 9 inclusive, and the molded pieces can be lifted together with its transfer platen 59 by lifting tines 88 of a fork lifting device indicated generally by the reference numeral 90. The hand holds 89 are provided on the lifting device 90 for guiding the finished piece 50 after being extruded from the mold.

It has been found that the cooperation of the resiliently connected mold halves and the vibrators 47 with the mandrels 52 results in a molded article with extremely smooth bores 51 therein. Each of the molded articles has the lower end of the bores 51 complete with the chamfer 64, and the upper or bell end is likewise complete with a chamfered surface 86. It has been noted also in the case where the article is molded from Portland cement-concrete having an extreme low water to cement ratio, that extremely high beam strength of the concrete has resulted also with extremely high impermeability.

While the invention has been described in terms of a preferred embodiment thereof, its scope is intended to be limited only by the claims here appended.

I claim as my invention:

1. In a mold comprising a pair of longitudinally extending mold portions spaced a slight distance from each other along contiguous mold portions, a pair of flanges on each mold portion in spaced confronting relationship with the flanges on the other mold portion, a shim of resilient material disposed between each pair of confronting flanges and maintaining said mold portions spaced a small distance apart, a plurality of fastening means spaced along the length of said mold, each of said fastening means including bolt means extending through said resilient shim and said paired flanges, the improvement in said mold which comprises resilient means between one end of said bolt means and one of said flanges, and a vibrator secured to one of said mold portions whereby said vibrator and said resilient shim, said confronting flanges, said resilient means and said fastening means enable said mold portion to move toward and away from each other during vibration.

2. In a mold comprising a pair of longitudinally extending mold portions spaced a slight distance from each other along contiguous mold portions, a pair of flanges on each mold portion in spaced confronting relationship with the flanges on the other mold portion, said flanges extending longitudinally of said mold portions, a shim of resilient material disposed between each pair of confronting flanges and maintaining said mold portions spaced a small distance apart, a plurality of fastening means spaced along said mold, each of said fastening means extending through a pair of confronting flanges and the resilient shim therebetween, the improvement in said mold which comprises resilient means between one end of said fastening means and one of the pair of said confronting flanges, and a vibrator secured to one of said mold portions whereby said vibrator, said resilient shim, said confronting flanges, said resilient means and said fastening means enable said mold portions to move toward and away from each other during vibration.

3. In the art of molding conduit having a plurality of bores therein, a mold having a plurality of mandrels extending longitudinally therein for forming the bores in said conduit, an upper pressure platen adapted to close said mold and having openings therein for the extension of said mandrels therethrough, said upper pressure platen having frustro-conical shaped extensions from the lower side thereof to form a chamfer at the upper end of each of said bores, a lower pressure platen having openings therein corresponding to said mandrels and having pressure transmitting means extending longitudinally of said mandrels and between the same for expressing a length of conduit from said mold, said lower pressure platen having the edges thereof spaced from the interior sides of said mold, said lower pressure platen being provided with upward extending sleeves having frustro-conical extensions therefrom, said sleeves and frustro-conical extensions closely encircling said mandrels and said frustro-conical extensions forming a chamfer at the lower end of said bores, a transfer platen adapted to rest on said lower pressure platen and disposed between said lower pressure platen and said molded conduit, the edges of said transfer platen fitting against the interior sides of said mold and having circular openings therein of a diameter corresponding to the diameter of the sleeves extending from said lower pressure platen, said transfer platen being removable with the molded conduit and the edges thereof being adapted to be engaged by fork lifting means, said lower pressure platen and the frustro-conical extensions therefrom being guided by said mandrels during expressing of said conduit from said mold, and said frustro-conical extensions maintaining said chamfers in said bores during the expressing of said conduit.

References Cited in the file of this patent

UNITED STATES PATENTS

| | | |
|---|---|---|
| 392,069 | Richardson | Oct. 30, 1888 |
| 396,466 | Carr | Jan. 22, 1889 |
| 669,693 | Harry | Mar. 12, 1901 |
| 772,845 | Stempel | Oct. 18, 1904 |
| 985,888 | Fair | Mar. 7, 1911 |
| 1,329,730 | Tracy | Feb. 3, 1920 |
| 2,099,265 | Freyssinet | Nov. 16, 1937 |
| 2,213,159 | Durley | Aug. 27, 1940 |
| 2,502,789 | James | Apr. 4, 1950 |
| 2,614,312 | Rankin et al. | Oct. 12, 1952 |
| 2,717,435 | Livingston et al. | Sept. 13, 1955 |
| 2,839,278 | Rowe | June 17, 1958 |

FOREIGN PATENTS

| | | |
|---|---|---|
| 73,038 | Denmark | Aug. 20, 1951 |
| 43,500 | Germany | June 18, 1888 |
| 668,023 | Great Britain | Mar. 12, 1952 |
| 131,370 | Sweden | Apr. 17, 1951 |